United States Patent
Youngers

(12) 
(10) Patent No.: US 7,233,705 B2
(45) Date of Patent: Jun. 19, 2007

(54) METHOD AND APPARATUS FOR REDUCING INACCURACIES WHEN PROCESSING COLOR DATA WITH A TONE MAP

(75) Inventor: Kevin J Youngers, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1334 days.

(21) Appl. No.: 09/911,912

(22) Filed: Jul. 24, 2001

(65) Prior Publication Data

US 2003/0020932 A1   Jan. 30, 2003

(51) Int. Cl.
*G06K 9/00* (2006.01)
*G06K 9/40* (2006.01)

(52) U.S. Cl. .................. 382/261; 382/167; 382/274
(58) Field of Classification Search ............... 382/167, 382/261, 274; 358/518, 523, 519, 521; 348/254, 348/256
See application file for complete search history.

(56) References Cited

U.S. PATENT DOCUMENTS

| | | | | |
|---|---|---|---|---|
| 4,831,434 A | * | 5/1989 | Fuchsberger | 358/521 |
| 5,287,418 A | * | 2/1994 | Kishida | 382/169 |
| 5,481,317 A | * | 1/1996 | Hieda | 348/674 |
| 5,719,965 A | | 2/1998 | Degi et al. | 382/254 |
| 5,854,859 A | | 12/1998 | Sobol | 382/261 |
| 5,949,482 A | | 9/1999 | Kawa | |
| 5,959,693 A | * | 9/1999 | Wu et al. | 348/624 |
| 6,215,529 B1 | * | 4/2001 | Sugimoto et al. | 348/675 |
| 6,636,229 B2 | * | 10/2003 | Ishikawa et al. | 345/590 |
| 6,753,987 B1 | * | 6/2004 | Farnung et al. | 358/518 |

FOREIGN PATENT DOCUMENTS

| | | |
|---|---|---|
| DE | 3630939 | 3/1988 |
| JP | 10126807 | 5/1998 |
| JP | 11284872 | 10/1999 |

\* cited by examiner

*Primary Examiner*—Colin LaRose

(57) ABSTRACT

A method and apparatus that reduces the inaccuracies in the tone map operation in the dark areas of an image.

19 Claims, 3 Drawing Sheets

METHOD AND APPARATUS FOR REDUCING INACCURACIES WHEN PROCESSING COLOR DATA WITH A TONE MAP

RELATED APPLICATIONS

This application is related to the application "Method and apparatus for reducing inaccuracies when processing color data with a matrix" that has Ser. No. 09/911,954 and was filed on the same day as this application.

FIELD OF THE INVENTION

The present invention relates generally to digital images and more specifically to a method and device for reducing inaccuracies when processing or creating color data.

BACKGROUND OF THE INVENTION

Digital cameras and scanners create image information by converting light into electrical signals using a photo-sensor. Typically the photo-sensors are charged coupled devices (CCD). The CCD's typically have 3 color filters arranged over the surface to sample the light in three different colors. Typically these are red, green, and blue. Scanners typically use an internal light source to illuminate the page. Cameras may use only the ambient illumination or they may add illumination to the scene using a flash. The electrical signal created by each pixel in the CCD is a function of the illumination in the scene, the reflectance of the object in the scene, the pass band of the filter over the pixel, and the inherent sensitivity of the CCD to light. One of the goals of these systems is to reproduce the color of an object on a computer display and with printed output. The computer display typically has different output characteristics than printers. One method used to help match the display with printers is call tone mapping. U.S. Pat. No. 5,719,965 entitled "Synthesized higher precision look-up table from lower-precision look-up table" which is hereby incorporated by reference, describes how tone maps are used. One type of adjustment done with tone maps is "gamma correction". Gamma correction typically maps reflectance space with a power curve. This curve has the property of increasing the contrast of the image in the dark areas and decreasing the contrast in the light areas. The tone map operation can be done in the scanner or camera hardware, or the raw color data may be sent to a computer where the image processing (including the tone map operation) is done.

CCD's sample light and convert it into electrical signals. These electrical signals are then converted into digital information typically using an A-to-D converter. CCD's are typically fairly linear in response to the intensity of light falling on each pixel. The human eye is not linear in response to intensity. The human eye responds more to density, which is the log of intensity. Because of this phenomenon a given change in intensity will be much more noticeable to the human eye if the change occurs in a dark area as compared to a light area of an image. For example in a system with 8 bits of resolution or 256 levels of intensity and 0 as black and 255 as white, a 2-count change in intensity from 10 to 12 may be much more noticeable to the human eye than the same 2-count change in intensity from 200 to 202.

The number of levels of light that the CCD and A-to-D converters can create has increased in recent years. Older scanners and cameras typically had 8 bits per color (256 levels) for a total of 24 bits. Today CCDs and A-to-D converters create 10, 12 and even 16 bits per color. In addition to the increase in the number of levels, currently available CCDs have improved their signal-to-noise ratios. This means that more of the total number of levels are actual signal instead of noise. These changes have made reproductions of the dark areas of the images much more accurate.

Unfortunately these changes have also created some problems. One of these problems is the tone map operation. In the dark areas of the image, inaccuracies in the tone map operation may show up as slight unintentional color changes in the image. These inaccuracies in the dark area are exaggerated when the tone map is using a gamma correction curve. The human eye may be unable to detect a slight change in brightness, but the human eye is very sensitive to small color shifts in the dark areas of an image. These small changes in color in the dark area of images can reduce the usability of these images.

What is needed is a method and apparatus that reduces the inaccuracies in the tone map operation in the dark areas of the image.

SUMMARY OF THE INVENTION

A method and device for improving the tone map operation in dark areas of an image.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENT

A method and apparatus that reduces the inaccuracies in the tone map operation in the dark areas of the image can increase the number of usable images.

Figure 1:
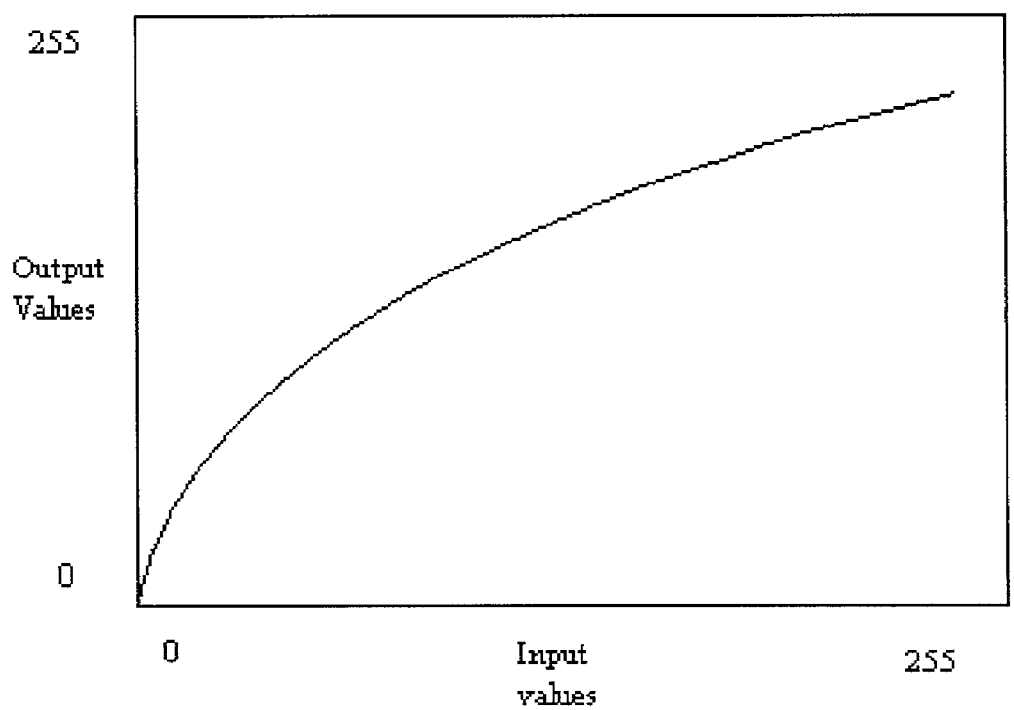
FIG. 1 is a chart of a gamma correction curve loaded into a tone map.

The raw color components of a sample or pixel from the photo-sensor of scanners, cameras, or the like are typically adjusted with a tone map operation to produce a more usable output color. The tone map operation creates new output color components for each pixel by mapping the raw color components from the pixel. Typically each color component has its own tone map. For example the raw red CCD output would be mapped using the red tone map to produce an adjusted red color for each pixel in the image. The tone map typically gamma corrects the raw CCD output by decreasing the contrast in the light areas of the image and increasing the contrast in the dark areas of the image (see FIG. 1).

Figure 2:
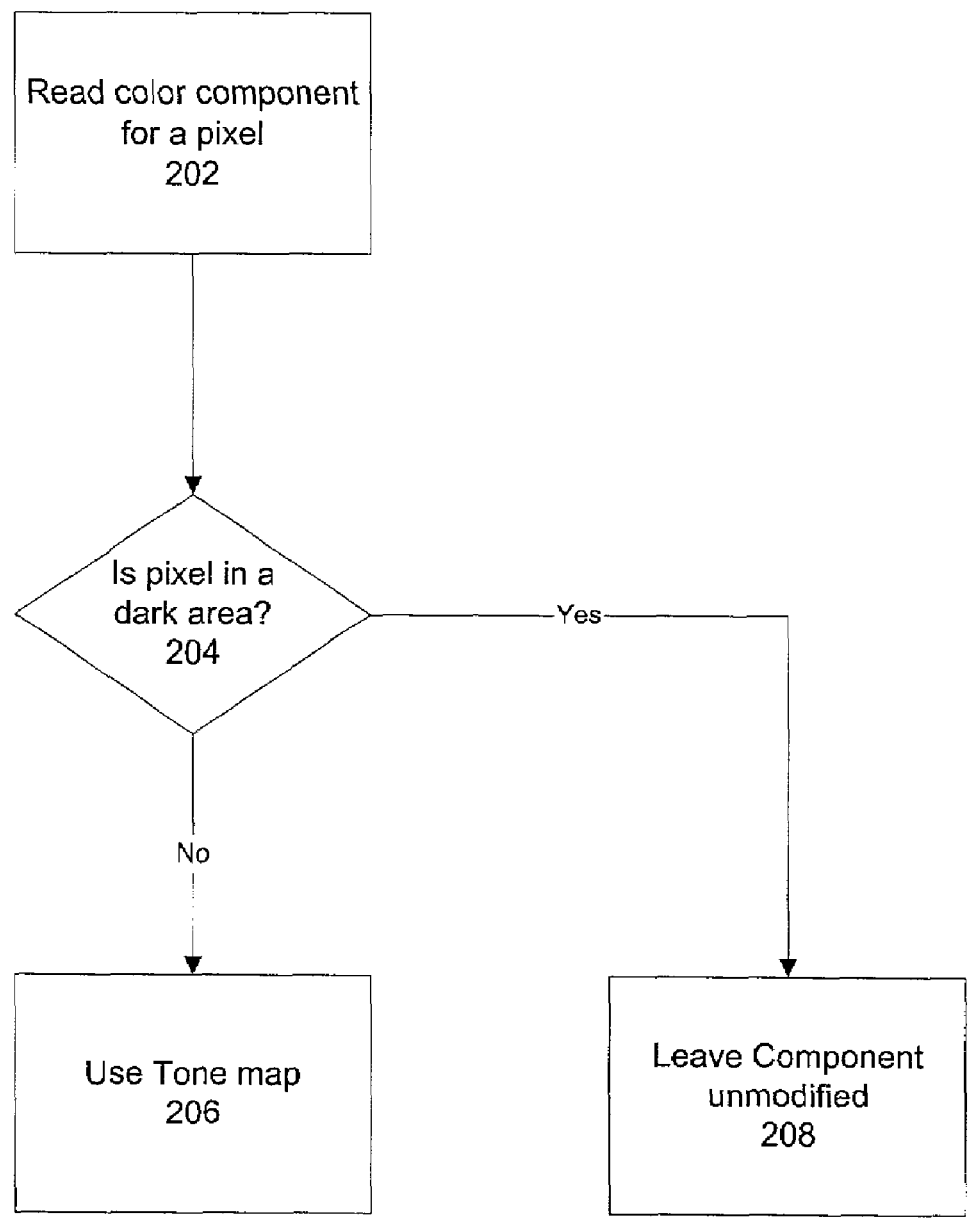
FIG. 2 is a flow chart for the tone map operation in accordance with one embodiment of the current invention.

When the pixel or sample is from a dark area in the image, non-linearity's in the tone map operation may cause unacceptable color shifts for the pixel. The image can be improved by avoiding the color shifts in the dark areas of the image by selectively applying the tone map operation only to pixels that are not in a dark area of the image (see FIG. 2). The selective tone map operation can be performed in the hardware of the scanner, camera, color copier, or the like, or the raw color data can be transferred to a computer where the selective tone map operation can be performed.

There are numerous methods to determine if the raw color component is in a dark area of an image. In one embodiment a threshold is defined and if the raw color component is greater than the threshold the color component is considered to be in a lighter area of the image. In a preferred embodiment the threshold level or value is approximately 20 eight-bit counts and in another preferred embodiment the threshold level or value is approximately 10 eight-bit counts.

In another embodiment there may be a threshold for each raw color contained in a pixel. For example in a pixel that contains 3 color components (red, green, and blue) there may be a red threshold, a green threshold, and a blue threshold. Each color component would be compared to its own threshold to determine if the tone map operation should be performed on that color component.

Once a color component has been classified as being in a dark area of the image, the color component can be preserved. In one embodiment the tone map step is skipped leaving the dark areas unchanged from the raw color photo-sensor output. In another embodiment a one to one mapping is used to replace the gamma curve in the tone map below the threshold level.

Figure 3:
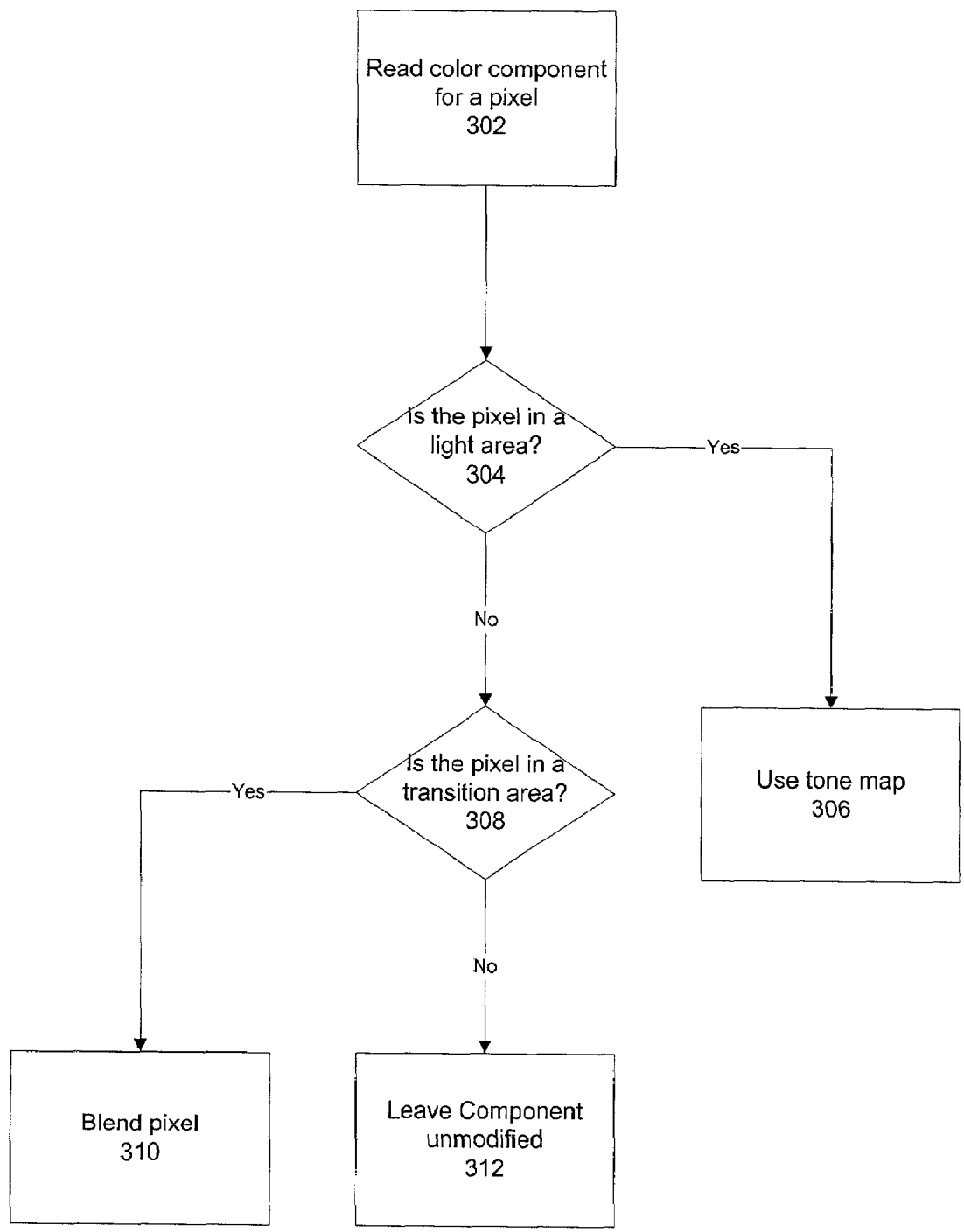
FIG. 3 is a flow chart for the tone map operation in accordance with another embodiment of the current invention.

A sharp transition between output pixels that are tone mapped and output pixels that are in the dark areas may create image artifacts. It may be desirable to blend or smooth the transition between the dark area pixels and the pixels modified by the tone map (see FIG. 3). When a color component is in a light area of the image (304) the tone map is used (306). If the color component is in a transition area (308) the color component may be blended or smoothed (310). When the color component is in a dark area of the image the raw color component may be used (312). There are many ways to define which color components are in a transition area.

In one embodiment two thresholds are defined. In a preferred embodiment the upper threshold is 30 and the lower threshold is 10. Any pixel that has a color component above the higher threshold is not considered to be in the dark area. These pixels are transformed using the tone map. Each color component lower than the second threshold is left unmodified. Each color component below the higher threshold and between the two thresholds is considered to be in the transition area. More than two thresholds can be used to create more than one transition area. Each color component falling into each transition area could be treated in a different way.

Once a color component is defined as being in a transition area the color component can be modified to help blend or smooth the transition between color component in the dark areas and color component not in the dark areas of the image. There are many ways to blend or smooth the transition area color components. In one embodiment the color components in the transition area are modified by interpolation between the raw values and the transformed values from the tone map. For example if the high threshold is 12 out of 256 levels and the low threshold is 8, and a color component has a raw red value of 11, and the tone mapped value is 9.5 then the interpolated value would be between 9.5 and 11. The interpolated red value between the raw red value of 11 and the tone mapped red value of 9.5 would be: $(12-8)/(11-8)=(9.5-11)/(X-11)$. Solving for X gives 9.875.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to clearly explain the principles of the invention and its practical application to thereby enable others skilled in the art to utilize the invention in various embodiments and various modifications as are suited to the particular use contemplated. It is intended that the appended claims be construed to include other alternative embodiments of the invention except insofar as limited by the prior art.

What is claimed is:

1. A method of processing color image data, comprising:
   (a) examining a color component of a pixel in the image;
   (b) selectively applying a tone map to the color component of the pixel to create an output color component only when the color component is not in a dark area of the image; and
   (c) selectively blending the transition between pixels in the image.

2. The method of claim 1, further comprising:
   repeating steps (a) and (b) for essentially each pixel in the image.

3. The method of claim 1, further comprising:
   blending the transition between pixels in the image that are in a dark area and pixels in the image that are not in a dark area.

4. The method of claim 1 where the tone map is using a gamma correction curve.

5. A method of processing color image data contained in an array of pixels, comprising:
   selecting at least two thresholds;
   (a) reading a color component of a pixel;
   (b) transforming the color component of the pixel with a tone map when the color component of the pixel is greater than one of the at least two thresholds, preserving the color component when the color component of the pixel is less than another of the at least two thresholds, and otherwise modifying the color component of the pixel to smooth the transition between color components of adjacent pixels.

6. The method of claim 5, further comprising:
   repeating steps (a) and (b) for essentially each pixel in the array.

7. The method of claim 6 where steps (a) through (b) are repeated to create a new output color component for each of the color components in the color image.

8. The method of claim 7 where a different threshold is used to create each output color component in the color image.

9. The method of claim 7 where there are different tone maps for creating each output color component in the color image.

10. The method of claim 5 where the threshold is approximately 20 eight bit counts.

11. The method of claim 5 where the threshold is approximately 10 eight bit counts.

12. A scanner, comprising:
    a photo-sensor array for converting an image into an electrical signal;
    an A-to-D converter to convert the electrical signal into raw digital data;
    a tone map for transforming the raw digital data into corrected digital data;
    the scanner configured to output the raw digital data when the raw digital data is below a first pre-selected threshold, to output the corrected digital data when the raw digital data is greater than a second pre-selected value, and to output digital data that is interpolated between the raw digital data and the corrected digital data when the raw digital data is between the two thresholds.

13. A method of processing data contained in an array of pixels, comprising:
    defining a threshold;
    defining a range around the threshold, the range having a top end and a bottom end;
    defining a tone map;
    (a) reading a color component of a pixel;
    (b) applying the tone map to the color component when the color component is above the top of the high end;
    (c) modifying the color component by interpolation when the color component is below the top end of the high range and above the bottom end of the low range, and;
    otherwise preserving the color component.

14. The method of claim 13 further comprising:
    repeating steps (a) through (c) for each pixel in the array.

15. The method of claim 13 where steps (a) through (c) are repeated to create a new output color component for each of the color components in the color image.

16. The method of claim 14 where a different threshold is used to create each output color component in the color image.

17. The method of claim 13, wherein modifying the color component by interpolation comprises interpolating between the color component value and a value generated with the tone map.

18. A camera, comprising:
    a photo sensor;
    a lens system that forms an image on the photo sensor;
    a tone map for mapping image data; and
    a processor configured to map image data only when the image data exceeds a predetermined value and configured to blend transitions in the image data.

19. A camera, comprising:
    a lens system that forms an image on a photo sensor;
    a means for mapping the image data; and
    a processor configured to map the image data only when the image data exceeds a predetermined value and configured to blend transitions in the image data.

* * * * *